(12) United States Patent
Schneegans et al.

(10) Patent No.: US 8,686,314 B2
(45) Date of Patent: Apr. 1, 2014

(54) METHOD OF SOLDERING OR WELDING COMPONENTS

(75) Inventors: Jochen Schneegans, Wittgert (DE); Martin Kraft, Eichenzell (DE)

(73) Assignee: FFT EDAG Produktionssysteme GmbH & Co. KG, Fulda (DE)

( * ) Notice: Subject to any disclaimer, the term of this patent is extended or adjusted under 35 U.S.C. 154(b) by 1023 days.

(21) Appl. No.: 12/300,037

(22) PCT Filed: May 10, 2007

(86) PCT No.: PCT/EP2007/004159
§ 371 (c)(1),
(2), (4) Date: Aug. 18, 2009

(87) PCT Pub. No.: WO2007/128586
PCT Pub. Date: Nov. 15, 2007

(65) Prior Publication Data
US 2010/0233508 A1    Sep. 16, 2010

(30) Foreign Application Priority Data
May 10, 2006   (DE) .......................... 10 2006 021 755

(51) Int. Cl.
*B23K 26/24* (2006.01)
*B23K 15/00* (2006.01)

(52) U.S. Cl.
USPC ............ 219/121.63; 219/121.13; 219/121.14; 219/121.64

(58) Field of Classification Search
USPC ............... 219/121.63, 121.64, 121.6, 121.85, 219/121.46, 121.14, 121.38, 121.17, 76.1, 219/76.12, 76.13, 76.14, 121.13, 79; 228/175, 187, 227
See application file for complete search history.

(56) References Cited

U.S. PATENT DOCUMENTS

| | | | | |
|---|---|---|---|---|
| 2,490,024 A | * | 12/1949 | Bernard | ...................... 219/76.14 |
| 3,585,351 A | * | 6/1971 | Hinrichs | .................. 219/121.13 |
| 3,824,368 A | * | 7/1974 | Locke | ....................... 219/121.64 |
| 4,348,131 A | * | 9/1982 | Shimanuki et al. | ... 219/137 WM |
| 4,563,745 A | * | 1/1986 | Panzeri | .................... 219/124.34 |
| 4,588,872 A | * | 5/1986 | Bollinger et al. | ........ 219/124.34 |

(Continued)

FOREIGN PATENT DOCUMENTS

| | | | |
|---|---|---|---|
| DE | 3905684 A | * | 8/1990 |
| DE | 43 28 515 | | 9/1994 |

(Continued)

OTHER PUBLICATIONS

Chen et al., "Study on Gap Detecting Sensor and Wire Feed Control in Butt Laser Welding with Filler Wire", Dec. 2002, SPIE, Proceeedings of SPIE, vol. 4915, pp. 208-217.*

(Continued)

*Primary Examiner* — Geoffrey S Evans
(74) *Attorney, Agent, or Firm* — RatnerPrestia

(57) ABSTRACT

A method for soldering or welding components in a series production wherein: a fixing seam which connects the components (1, 2) is produced by melting a connecting material (3), which is supplied as an additional material or is formed by a base material of the components (1, 2), along a joint formed by the components (1, 2); and a volume-forming layer of connecting material is deposited onto the fixing seam by melting, or the fixing seam produced by means of the connecting material supplied as an additional material is re-melted.

15 Claims, 3 Drawing Sheets

(56) References Cited

U.S. PATENT DOCUMENTS

| | | | | |
|---|---|---|---|---|
| 5,064,991 | A | * | 11/1991 | Alborante ................. 219/121.63 |
| 5,107,093 | A | * | 4/1992 | Ekelof et al. ............. 219/124.34 |
| 5,233,149 | A | * | 8/1993 | Killian et al. .............. 219/76.12 |
| 5,446,257 | A | * | 8/1995 | Sakamoto et al. ........ 219/121.63 |
| 5,841,098 | A | * | 11/1998 | Gedrat et al. ............. 219/121.63 |
| 6,145,194 | A | * | 11/2000 | Munson et al. .............. 29/889.1 |
| 6,336,583 | B1 | * | 1/2002 | Wang et al. .................... 228/225 |
| 6,521,861 | B2 | * | 2/2003 | Jones et al. .............. 219/121.64 |
| 6,525,293 | B2 | * | 2/2003 | Schwankhart ............. 219/85.13 |
| 2001/0013509 | A1 | * | 8/2001 | Haschke .................. 219/121.64 |
| 2003/0218056 | A1 | * | 11/2003 | Fairchild et al. .............. 228/175 |
| 2006/0201915 | A1 | * | 9/2006 | Obana et al. ................. 219/76.1 |
| 2006/0249486 | A1 | * | 11/2006 | Rippl ....................... 219/121.63 |

FOREIGN PATENT DOCUMENTS

| | | |
|---|---|---|
| DE | 196 43 434 | 5/1997 |
| DE | 196 18 256 | 12/1997 |
| DE | 198 03 734 | 8/1999 |
| DE | 100 06 852 | 8/2001 |
| DE | 10 2004 028787 | 1/2006 |
| EP | 0 538 087 | 4/1993 |
| EP | 1 029 774 | 8/2000 |
| EP | 1419848 A2 * | 5/2004 |
| JP | 52-77841 A * | 6/1977 |
| JP | 54-49940 A * | 4/1979 |
| JP | 1-162587 A * | 6/1989 |
| JP | 9-122952 A * | 5/1997 |
| JP | 9-201687 A * | 8/1997 |
| JP | 2000-117470 A * | 4/2000 |
| JP | 2003-112525 A * | 4/2003 |
| JP | 2004-25284 A * | 1/2004 |
| WO | WO 2005/035179 | 4/2005 |
| WO | WO 2005/107996 | 11/2005 |

OTHER PUBLICATIONS

Machine translation of Japan Patent No. 9-122,952, Jun. 2013.*
Machine translation of Japan Patent No. 2003-112,525-A, Jun. 2013.*
Machine translation of Japan Patent No. 2004-25,284-A, Jun. 2013.*
International Search Report for PCT/EP2007/004159.
Communication from German Patent Office dated Jan. 11, 2007.

* cited by examiner

METHOD OF SOLDERING OR WELDING COMPONENTS

This application is the U.S. national phase application of PCT International Application No. PCT/EP2007/004159, filed May 10, 2007, which claims priority to German Patent Application to No. DE 10 2006 021 755.1, filed May 10, 2006.

BACKGROUND OF THE INVENTION

1. Technical Field

The invention relates to: a method for soldering or welding components, preferably metal sheets, in a series production; a component composite produced by soldering or welding; a production line for joining components, including a production stage which includes soldering or welding; and lastly, a tool head which is particularly suitable for performing the method. The invention can in particular be used in the series production of vehicle body parts for soldering or welding metal body sheets. It is in particular suitable for joining metal sheets of the outer shell of vehicles, for example for joining a side part to a roof part, or for joining an outer metal sheet to an inner metal sheet of an attachment part, such as for example a door or hatchback.

2. Description of the Related Art

When assembling body shells of automobiles, metal body sheets—for example, side body parts and roofs—are connected to each other by laser-beam soldering or laser-beam welding. The metal body sheets to be connected to each other are tensed relative to each other in a joining position and then soldered or welded together. In modern production lines, only a limited amount of time is available for the soldering or welding process, as a result of which the quality of the soldering or welding seam to be produced suffers. On the other hand, the soldering or welding seam has to form a seal and exhibit a smooth outer surface. In particular, the seam must not be permeated with wormholes.

A method and device for laser-beam soldering or laser-beam welding are for example known from DE 100 06 852 C5. A soldering or welding wire, from which the soldering or welding seam is produced, simultaneously serves as a contact sensor, by means of which the device is guided along a joint formed between the work piece parts to be connected, when the method is performed. Other methods and devices are described in DE 198 03 734 C2 and DE 10 2004 028 787 A1.

SUMMARY OF THE INVENTION

It is an object of the invention to enable a high-quality soldering or welding seam, which connects the components, to be produced, despite the only limited amount of time available in series productions.

The object is solved by splitting the soldering or welding process into multiple process steps—preferably, precisely two process steps—which are performed in succession. In a first process step, a fixing seam which fixes the geometry of the desired component composite and is in this sense a geometry-forming fixing seam is produced by melting a connecting material along a joint formed by the components to be connected. The connecting material is preferably a soldering or welding material which is supplied as an additional material. In principle, however, the fixing seam can also be produced by melting only a base material of the components, wherein the connecting material is provided by the components themselves. In a preferred first variant of a subsequent second process step, a volume-forming layer of a connecting material is deposited, i.e. melted on, by melting said connecting material. The connecting materials of the two process steps should exhibit melting points which are at least near to each other, and should also otherwise be metallurgically similar enough to each other that they are materially connected fixedly to each other when the volume-forming layer is deposited. Preferably, the same connecting material is used in the two process steps. The two process steps can be simultaneously performed along the same joint, for example using a leading tool and a trailing tool. However, the two process steps are more preferably performed separately, by performing the second process step along the same joint but not until after the first process step has been completely performed. Instead of melting additional connecting material onto the previously produced fixing seam in the second process step, an alternative second method variant of the second process step consists merely of re-melting the fixing seam, without depositing any additional material. In the second variant, the fixing seam is produced by means of additional material, and in the second process step, this connecting material of the fixing seam is heated enough that it is compacted at least over its entire outer surface and a near-surface depth range, and—at least in the compacted depth range—exhibits a material structure which fulfils the quality demands made on the soldering or welding seam with regard to porosity and also in other regards, and in particular forms a smooth surface and at least does not exhibit any wormholes permeating the finished seam, but rather at most closed pores. As a result, the invention comprises at least two process steps, and connecting material in the form of an additional material is supplied in at least one of these process steps and melted in the respective process step. In preferred embodiments, a connecting material is supplied as an additional material in both the first process step and the second process step.

The fixing seam merely has to fix the components relative to each other in a joining position and can therefore be relieved of any other functions. In particular, it does not have to already fulfil the demands with regard to porosity. Correspondingly, the fixing seam can be produced at a greater progressing speed than conventional soldering or welding seams which are produced as a finished seam in only one process step. In order to fulfil its geometry-forming function, the fixing seam could in principle be embodied as a stitching and/or quilting seam, i.e. as a discontinuous seam with interruptions, but is preferably produced as a continuous seam. Since no particular demands have to be made on the quality of the material structure of the fixing seam, in particular the absence or at least low level of pores, the fixing seam can advantageously be produced continuously in the longitudinal direction of the joint. If the fixing seam is produced as a quilting seam, the interruptions in the seam are however only so long that the geometry-forming function is fulfilled despite the interruptions, and it is ensured that the components cannot be ajar from each other along the joint when they are only held to each other by means of the fixing seam, as viewed via the joint. The fixing seam is, at least in this sense, continuous and not a stitching seam in the broadest sense. Producing a geometry-forming fixing seam also has the advantage that the components which in accordance with the invention have already been joined in a geometry-forming way, i.e. in a geometry-preserving way in the above sense, no longer have to be tensed in order to complete the seam, but rather the components can be released as soon as the fixing seam has been produced, such that in the subsequent second process step, the volume-forming layer can be deposited or the fixing seam can be re-melted without any obstruction from clamps of a tensing means. With regard to the time pressure, the fact is also advantageously brought to bear that producing the fixing seam is not a matter of introducing the entire volume of a finished seam into the joint while using additional material. In the preferred first method variant, more connecting material is in fact advantageously introduced when producing the volume-forming layer. If the production speed for the fixing seam can already be increased due to the reduced quality demands, then the production speed can be further increased by reducing the connecting material to be introduced per unit of length.

The volume-forming layer or compacting re-melt is preferably produced at an advancing speed which is lower as compared to the fixing seam along the joint and can correspond to the advancing speed which is usual for conventional connecting seams. In the preferably two-tier finished seam, the volume-forming layer is the covering seam and can be produced with a very smooth outer surface and low porosity due to the production speed and/or advancing speed being lower as compared to the fixing seam. If soldering or welding material is introduced as an additional material in two steps, it is also possible to reduce the soldering or welding material to be introduced into the joint per process step, which enables the volume-forming layer—and, in principle, the fixing seam—to be produced at a higher production speed but to the same quality as conventional seams, or to be produced to a higher quality at the same production speed. In the case of the fixing seam, this gain in flexibility is preferably implemented as a higher production speed, while for the volume-forming layer, an increase in quality is preferred.

The term "joint" is broadly conceived in the sense of the invention, but is preferably a butt joint or seamless joint along which the components abut each other. Thus, the joint can have a V shape, or can for example be an overlapping joint, an angle joint or as applicable also a multiple joint between components. Correspondingly, the finished seam can for example be a V seam, hollow seam or other seam shape. Thus, in principle, the joint can be formed in any shape between mutually facing flanks of the components to be connected. The respective flanks form the edges of the joint.

Laser-beam soldering or laser-beam welding is preferably used as the soldering or welding method. Alternatively, however, other methods can also be used in which the respective connecting material is melted by means of an energy beam. Alternatives to laser-beam joining are for example soldering or welding by means of an electron beam or a plasma beam. An electric arc—which is also understood in its broader sense as an energy beam—can also in principle be used to melt the connecting material.

Copper-based alloys, aluminium-based alloys or iron-based alloys can in particular be used as the soldering or welding material. Copper-based alloys are primarily to be considered for soldering steel components, and iron-based alloys are primarily to be considered for welding.

In preferred embodiments, the fixing seam is produced at a speed—as measured in the longitudinal direction of the joint—which is greater by a factor of at least 1.5 than the speed at which the volume-forming layer is produced or the fixing seam is re-melted. The production speed of the fixing seam can advantageously even be twice as great as the production speed of the volume-forming layer or the re-melted fixing seam, or as applicable even greater. Since, in the extreme case, the fixing seam is merely a matter of producing a fixed composite, which is no longer variable with regard to its geometry, from the components, the production speed of the fixing seam can advantageously be greater than 3 m per minute, which is generally regarded as the upper limit for conventionally produced connecting seams, since at greater speeds, the quality demands which are to be made on finished seams can only then be fulfilled at particular effort, which increases the costs. In accordance with the invention, the fixing seam can be perfectly well deposited at a progressing speed of up to 6 m per minute or even above.

In the preferred variant in which the volume-forming layer is deposited onto the fixing seam, the fact is also advantageously brought to bear that the edges of the joint are automatically cleaned as the fixing seam is produced, and the quality of the volume-forming layer is thus further increased. In order to be able to use this advantage, undiminished, in the second process step, a joining tool which performs the second process step is tactilely guided along the joint in preferred embodiments in such a way that a contact sensor provided for tactilely guiding does not touch the previously produced fixing seam but rather merely runs off on the mutually facing edges of the joint, i.e. only contacts the left-hand and right-hand edge of the joint during guiding contact and exhibits a clear distance from the fixing seam. As an alternative to such two-point guidance, in which contact can also be linear or in a narrow strip, it would also for example be possible to use the tool known from DE 100 06 852 C5. Using a conventional contact sensor is in principle also conceivable, although the danger then rather exists of the joining environment—previously cleaned by the first process step—being partially contaminated. The preferred two-point guidance can also advantageously be realised for guiding a joining tool which performs the first process step. Furthermore, two-point guidance is also advantageous for the second method variant—re-melting the fixing seam. The contact sensor forms a contact point on each of two mutually opposite outer sides which is preferably punctiform or linear or as applicable strip-shaped. In the transverse direction of the joint, the contact points exhibit a distance from each other which is greater than the width of the outer surface of the volume-forming layer—also measured in the transverse direction—or at least greater than the width of the outer surface of the previously produced fixing seam. If, as is preferred, the joining tool is fitted with a wire supply for wire-shaped soldering or welding material, then the distance between the contact points of the contact sensor is greater than the thickness of the wire, preferably by a factor of at least 1.5.

In addition to the method, the subject of the invention also includes a component composite itself which can be produced by means of the method. The component composite comprises at least two components and a soldering or welding seam which connects the components to each other. The soldering or welding seam produced in accordance with the invention is multilayered in accordance with the preferred first method variant, but can also merely be single-layered in the second method variant. The multilayered variant preferably has precisely two layers, comprising a lower layer formed by the connecting material of the fixing seam and a covering layer formed by the volume-forming layer and a part of the fixing seam. One characteristic of the multilayered finished seam is a melting line which may be seen in the cross-section of the seam. The melting line is created by depositing the volume-forming layer, during which the connecting material of the fixing seam is re-melted at least in a depth range which borders the volume-forming layer. The melting line separates the re-melted depth range from the remaining depth range of the fixing seam further beneath it. The finished seam produced in the second method variant also exhibits a melting line if the connecting material of the fixing seam, when re-melted, is not completely re-melted but only in the depth range which borders the surface of the fixing seam.

The finished seam produced according to one of the two method variants exhibits a very low porosity, at least from its surface to the melting line. In particular, it does not acquire any wormholes, but rather at most closed pores. The largest of the pores which may still be present each have at most the volume of a sphere having a diameter of 0.3 mm, preferably 0.2 mm.

Additionally, the subject of the invention—which, as mentioned at the beginning, is used in series production—also includes a production line for joining components, preferably vehicle body parts. In such production lines, groups of components which are to be joined to each other, for example a base part, side parts and a roof of a body, are conveyed along a conveying line through a succession of joining stations or other processing stations and successively joined or otherwise processed. The components which are to be joined to each other are tensed relative to each other in a geometry station with the aid of a tensing means and in a joining position which they are supposed to adopt relative to each other in the component composite to be produced. The respective group of components are permanently and fixedly joined, while tensed, by welding or soldering. Once they have been joined, the tensing means is detached from the component composite, such that the latter can continue to be conveyed in the conveying line to the next processing station. The geometry station has one or more robots for joining, comprising a robot arm or arms on which one or more joining tools is/are arranged—in the case of the invention, an energy-beam soldering tool or energy-beam welding tool for producing a soldering or welding seam in each case. The ends of the robot arms serve as actuators which are freely movable spatially. The tensing means forms interference contours for the joining process. Furthermore, only a short dwelling time or sluicing time of the respective group of components in or through the geometry station is set, typically in the range of about a minute. A large part of this time is required for tensing the components. In most applications, the components are not tensed during transport, such that the transport time in and out of the geometry station also has to be taken into account. Only the remaining time left is still available for the joining process.

This is where aspects of the invention come into play and produces the fixing seam in the time available.

The geometry station has at least one first actuator which is spatially movable and preferably formed by a robot. The first actuator is fitted with a first tool head. The first tool head is an energy-beam soldering head or energy-beam welding head for producing the fixing seam. The connecting material is provided in the form of a soldering or welding wire or is provided by the base material of the components. If the joint is produced using additional material, the first tool head comprises a wire guide by means of which the wire can be guided in the longitudinal direction of the wire through an outlet of the wire supply, into the joint. The outlet can form the wire guide or a guiding part of the wire guide; preferably, a wire guide is provided on the path of the wire, in front of the outlet. The tool head also comprises a first energy emitter, directed towards the tip of the wire, for melting the connecting material. To this extent, the first tool head can correspond to conventional energy-beam soldering heads or energy-beam welding heads. However, the wire is preferably thinner than conventionally used soldering or welding wires. The wire preferably has a diameter of 1.4 mm at most, whereas wires having a diameter of typically 1.6 mm have hitherto been used. 1.2 mm is a particularly preferred wire thickness which, however, can easily be reduced to 1.0 mm, or lower as applicable. At least one second actuator which is spatially movable is arranged downstream of the geometry station in the conveying direction of the conveying line and fitted with a second tool head. The second process step in accordance with the invention is performed using the second tool head. The second tool head comprises at least one second energy emitter. If the volume-forming layer is deposited in the second process step, the second tool head also comprises a wire guide and an outlet for the soldering or welding wire from which the geometry-forming layer is formed. With respect to the energy emitter and the wire guide, as well as the wire itself, the two tool heads can be designed identically. If the fixing seam is merely re-melted in the second process step, the wire guide can be omitted in the second tool head.

The respective group of components are preferably stationary in the geometry station during tensing and soldering or welding. Alternatively, however, the conveying line can also convey them through the geometry station continuously or at a temporarily reduced speed. If the group of components do continue to be conveyed during their time in the geometry station, a correspondingly mobile tensing means is to be provided.

In preferred embodiments, the second tool head is fitted with the contact sensor described, in order to tactilely guide the second tool head along the joint, without touching the fixing seam. Such an embodiment is preferred for the second tool head with respect to both method variants. The second actuator comprising the second tool head can be arranged at any point downstream of the geometry station. One or more other processing station(s) or one or more purely buffering station(s) can thus be arranged along the conveying line between the geometry station and the second actuator. The second actuator comprising the second tool head can be part of such a processing station or in particular part of such a buffering station, such that the second process step of the method in accordance with the invention is performed alone or in combination with another process in the respective station. Preferably, a separate joining station is provided for the second process step alone. It is also true of the second process step that, while the component composite which is already held together by the fixing seam is preferably stationary in the respective joining station, it can however also continue to be conveyed while the second process step is being performed, even more so than with the first process step.

Although the respective energy emitter can also simultaneously be an energy-beam producer and, correspondingly, such an energy-beam producer can also be part of the respective tool head, the energy beam is not produced on or in the tool head in accordance with preferred embodiments but rather separately from it, at a different point. The energy-beam producer which is separate from the tool head—preferably, a laser-beam producer—is connected to the tool head and its energy emitter by means of an energy transmission means, preferably via an optical wave guide. The tool head has a corresponding port for injecting the energy produced by the energy-beam producer, preferably laser energy. If multiple tool heads are used, as described above using the example of the production line, a separate energy-beam producer can be provided for each of the tool heads; preferably, however, multiple tool heads—for example, said first tool head and said second tool head—are connected, each via an energy transmission means, to an energy-beam producer which is jointly provided for the respective tool heads. Such a device, comprising the multiple tool heads and the common laser-beam producer, preferably has the ability to selectively supply each of the tool heads and/or their energy emitters with the required energy, respectively. If there are more than two tool heads, multiple groups of tool heads can also be formed which are supplied by a common energy-beam producer, wherein the device comprising the energy-beam producer and the multiple groups of tool heads also preferably has the ability to selectively supply each of the groups with the required energy, respectively.

BRIEF DESCRIPTION OF THE DRAWINGS

Example embodiments of the invention are illustrated below on the basis of figures. Features disclosed by the example embodiments, each individually and in any combination of features, advantageously develop the subjects of the claims and the embodiments described above. There is shown:

DETAILED DESCRIPTION

Figure 1:
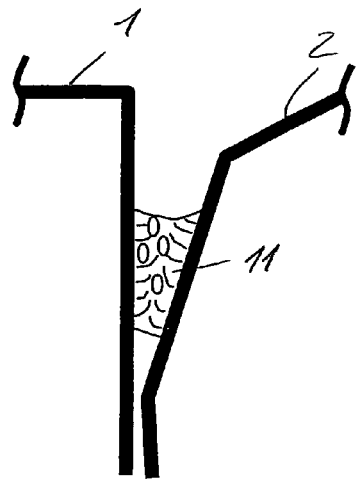
FIG. 1 a component composite comprising a fixing seam according to a first variant.

FIG. 1 show a cross-section of a component composite consisting of two components 1 and 2 and a fixing seam 11. The fixing seam 11 connects the components 1 and 2 along a jointly formed joint. Only the two flanks of the components 1 and 2 are shown, between which the joint and correspondingly the edges of the joint are formed. The component 1 is for example a side wall, and the component 2 is for example a metal sheet roof of a body shell of an automobile. The flank of the component 1 which faces the component 2 forms a progressive ratio relative to the component 2. The components 1 and 2 are in abutment at the base of the joint. The fixing seam 11 consists of a soldering material, for example a copper alloy or an aluminium alloy. The fixing seam 11 connects the components 1 and 2 permanently and fixedly to each other and in this sense has a geometry-forming effect on the component composite.

Figure 2:
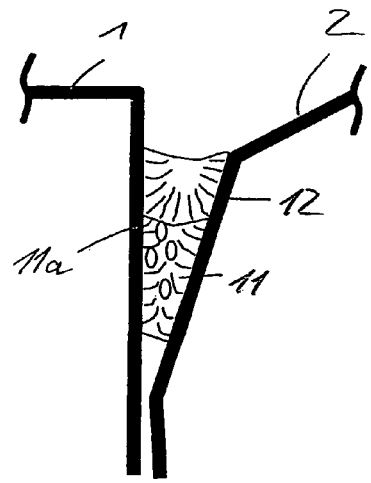
FIG. 2 the component composite comprising a finished seam according to the first variant.

FIG. 2 shows the component composite after a covering layer 12 of soldering material has been deposited by melting onto the fixing seam 11 of FIG. 1. The same soldering material is used for melting-on the covering layer 12 as for the fixing seam 11.

In a first method variant, the fixing seam 11 and the covering layer 12 are formed in two process steps. FIG. 1 shows the result of the first process step, and FIG. 2 shows the result of the second process step. Before the first process step is performed, the components 1 and 2 are tensed relative to each other in the desired joining position. In the example embodiment, they are lying in abutment as shown, i.e. they are tensed against each other in a force fit, which is to be preferred over the equally possible alternative of tensing them in a purely positive fit. The components 1 and 2 which are tensed in the joining position form the joint shown in the cross-section between their mutually facing component flanks.

In the first process step, the geometry-forming fixing seam 11 is produced in the joint by melting off the soldering material—in the example embodiment, by laser-beam soldering. In the finished connecting seam 11, 12, the material of the fixing seam 11 forms a lower layer which is also designated as 11 in FIG. 2. In the second process step, the covering layer 12 is deposited onto the fixing seam 11—in the example embodiment, also by laser-beam soldering. When melting off and depositing the molten mass, the fixing seam 11 is also melted at least at its surface and in a near-surface depth range and thus compacted in the respective depth range up to a melting line 11a. Thus, a part of the fixing seam produced in the first process step is situated above the melting line 11a. Once hardened, this part is attributed to the covering layer 12 in the sense of the invention. The melting line 11a does not separate the soldering material introduced into the joint while the fixing seam is produced from the soldering material introduced in the second process step. Rather, two mutually distinguishable structures and/or phases abut each other at the melting line, namely the relatively porous phase of the fixing seam 11 which forms the lower layer 11 in the finished seam, and the comparatively much less porous phase of the covering layer 12, most of which is formed by the soldering material introduced in the second process step but a smaller part of which is formed by the re-melted soldering material of the fixing seam 11. Once hardened, there may also be said to be two tiers 11 and 12, in order to distinguish in terminology between the phases separated from each other by the melting line 11a and the successively deposited layers 11 and 12. In the first process step, the fixing seam 11 is progressively produced along the joint at a much greater speed than the covering layer 12, such that after it has hardened but before the covering layer 12 is deposited, the fixing seam 11 exhibits a substantial porosity. However, the relatively high porosity is drastically reduced at least in the near-surface depth range of the fixing seam up to the melting line 11a, where the material defects of the fixing seam 11 are cured by depositing the covering layer 12.

Figure 3:
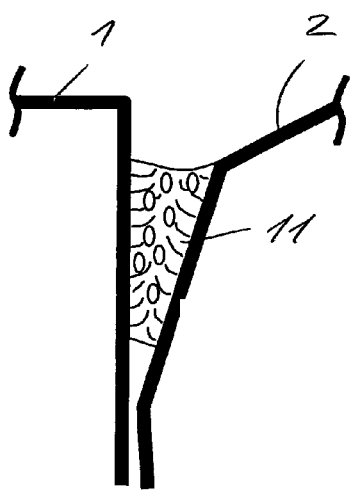
FIG. 3 a component composite comprising a fixing seam according to a second variant.

FIG. 3 shows a component composite which is formed from two components 1 and 2 and a fixing seam 11 and corresponds to the example embodiment of FIG. 1, except for the fixing seam 11.

Figure 4:
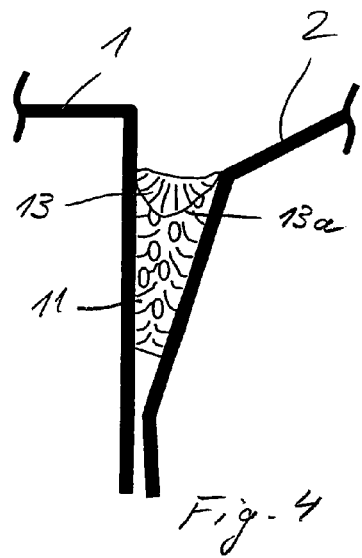
FIG. 4 the component composite comprising a finished seam according to the second variant.

FIG. 4 shows the arrangement of FIG. 3, after the fixing seam 11 has been converted into a finished connecting seam and/or finished seam 11, 13. The finished seam 11, 13 has also been produced in two process steps, but in a second method variant. In the second method variant, soldering material is only introduced in the first process step. Thus, the entire soldering material—which in the first method variant is introduced over two process steps—is also simultaneously introduced in one process step in which the geometry-forming fixing seam 11 is produced. By neglecting the quality demands to be made on the material structure of the finished seam 11, 13, the fixing seam 11 is also formed in the second method variant at a production speed—measured in the longitudinal direction of the joint—which is higher than for conventional energy-beam soldering methods of the same type—in the example embodiment, laser-beam soldering methods. The fixing seam 11 is re-melted in the second process step and thus compacted from its surface up to a melting line 13a. In the tier 13 between the free surface and the melting line 13a, the finished seam 11, 13 exhibits a similarly advantageous material structure to the covering layer or covering tier 12 of the first example embodiment. Beneath the melting line 13a, the porosity corresponds to that of the fixing seam 11. The difference between the phases 11 and 12 on the one hand and 11 and 13 on the other, in particular with regard to their porosity, can be seen in the micrograph with the naked eye, or at least under the microscope, in both method variants.

As the fixing seam 11 cools, grain growth begins at the two surface areas of the components 1 and 2 which are in contact with the melted soldering material, i.e. the molten mass. The grain growth begins at the respective boundary surfaces and continues into the molten mass. The progressing direction initially points from the respective boundary surface into the molten mass and inclines more and more towards the free surface as it progresses further, as indicated schematically in FIGS. 1 and 3. Depending on the progressing speed during deposition, the phase of the fixing seam 11 thus acquired contains more or fewer large pores. When the covering seam 12 is deposited, the fixing seam 11 is melted-on at its free surface. The structural defects—in particular, the pores—are cured at least in the melted-on depth range. During cooling, which transpires more slowly than the cooling of the fixing seam 11 due to the lower depositing speed of the covering layer 12, the grain growth is correspondingly slowed. The soldering material already present in the fixing seam 11 absorbs heat. The grain growth therefore occurs from the melting line 11*a* or 13*a*—from the respective melting surface, as viewed over the entire seam—and the two lateral boundary surfaces of the components 1 and 2, towards the free surface. The structure which arises in the covering tiers 12 and 13 in accordance with the grain growth is qualitatively shown in FIGS. 2 and 4.

Figure 5:
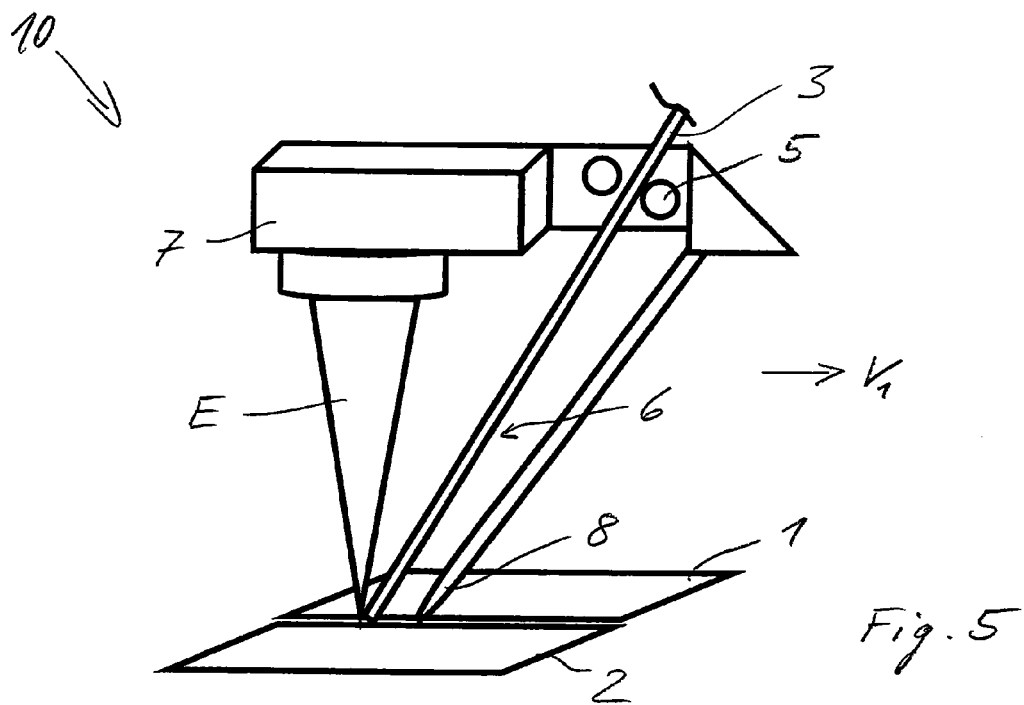
FIG. 5 a tool head for laser-beam soldering or laser-beam welding.

FIG. 5 shows a schematic representation of a tool head 10. The tool head 10 can be fastened to an actuator which is freely movable spatially. One end of a robot arm can in particular form the actuator. The tool head 10 comprises a wire guide 5 for a soldering wire 3, an energy emitter 7 for producing an energy beam E, and a contact sensor 8 for tactilely guiding the tool head 10 in the longitudinal direction of the joint formed by the components 1 and 2. The wire guide 5 of the example embodiment is formed by two reels, between which the soldering wire 3 is conveyed through towards an outlet 6, of which only the geometric location is indicated in FIG. 5 by means of the reference sign 6. The soldering wire 3 is conveyed to the tool head 10 from a wire storage arranged outside the tool head 10 by means of a conveying means which is preferably also arranged outside the tool head 10. The wire storage is preferably arranged stationary in a processing station of the actuator. The conveying means can be arranged on the actuator or at a different point in the processing station. During soldering, the soldering wire 3 is unwound by means of the conveying means from the wire storage, which is for example formed as a reel, conveyed to the tool head 10 and conveyed in the longitudinal direction of the wire, through the outlet 6, into the joint. The energy emitter 7 directs the energy beam E towards the joint, more specifically onto the location at which the free end of the soldering wire 3 passing through the outlet 6 is to melted. During soldering, the tool head 10 is moved along the joint in the processing direction at a constant speed V1, wherein the soldering wire 3 is continuously melted off and replenished via the wire guide 5. The contact sensor 8 is arranged ahead of the outlet 6 and the focus of the laser emitter 7. The contact sensor 8 can be formed as a conventional guide finger which taps the profile of the joint at its base and guides the tool head 10, in particular the energy emitter 7, in accordance with the profile of the joint. The tool head 10 which is fitted with a conventional contact sensor 8 is in particular suitable for producing the fixing seam 11 of the two method variants.

Figure 6:
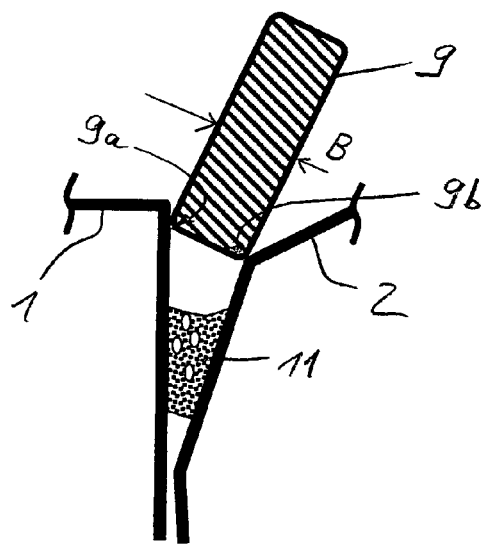
FIG. 6 a contact sensor of the tool head.

FIG. 6 shows a cross-section of a modified contact sensor 9, such as is in particular suitable for producing the covering layer 12 of the first method variant and for re-melting in accordance with the second method variant. Except for the modified contact sensor 9, the tool head for producing the covering layer 12 can correspond to the tool head 10. If the modified tool head is only used to perform the re-melting step of the second method variant, the wire guide 5 or 5, 6 can be omitted.

The modified contact sensor 9 is shaped for two-point guidance. It comprises contact points 9*a* and 9*b* on two outer sides facing away from each other. During guiding contact, the contact point 9*a* of the contact sensor 9 contacts the edge of the joint formed by the component 1 and shown on the left in FIG. 6, and the contact point 9*b* of the contact sensor 9 contacts the edge of the joint formed by the component 2 and shown on the right in FIG. 6. One condition for the constant guiding contact on both sides is that the edges of the joint face each other in the area of contact, i.e. as viewed in a tangential extension, an angle of less than 180° is enclosed between them. This condition is already met in the example embodiments due to the progressive ratio formed by the component 2. Similar conditions always obtain for angle joints or singularly overlapping joints between components. In the scenario shown in FIG. 6, it is assumed that the covering layer 12 of the first method variant is being produced. Correspondingly, FIG. 6 shows the state after the fixing seam 11 has been produced. As viewed in cross-section, the contact sensor 9 is wide enough that the distance B which the contact points 9*a* and 9*b* exhibit from each other is larger than the width of the surface of the fixing seam 11 as measured in the same cross-section. This ensures that the contact sensor 9 always exhibits a clear distance from the fixing seam 11 during guiding contact with the edges of the joint. The distance and/or width B is preferably also larger than the free surface of the covering layer 12 which is to be produced. If the contact sensor 9 is part of a tool head provided for re-melting in accordance with the second method variant, then the distance B is larger than the free surface of the fixing seam 11 produced in accordance with this variant.

Figure 7:
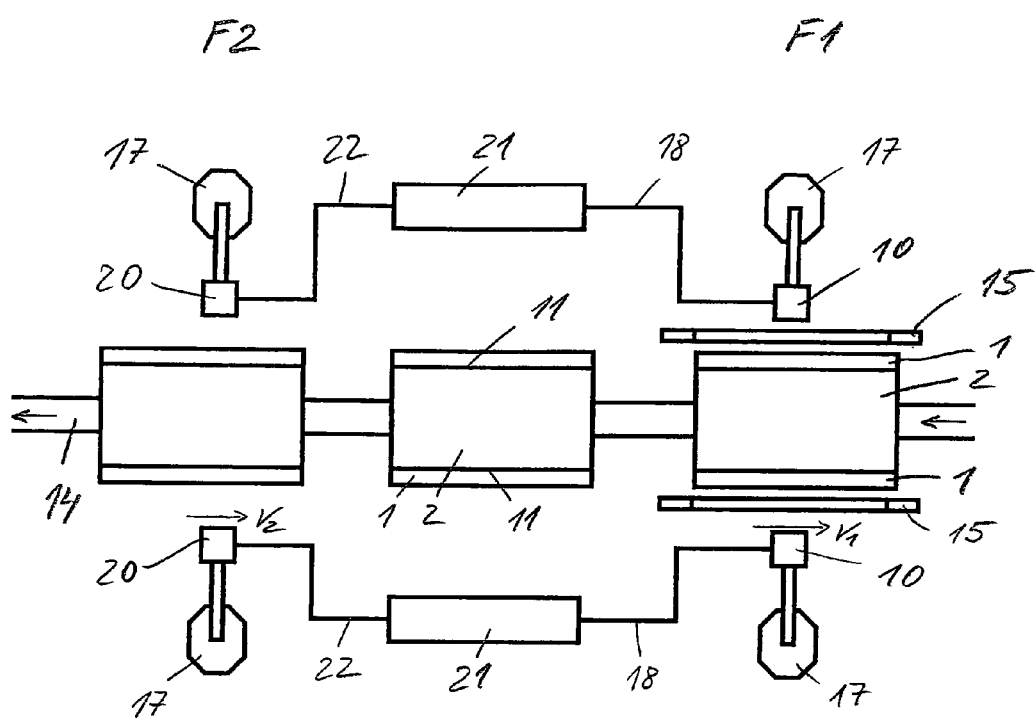
FIG. 7 a production line for joining components.

FIG. 7 shows a section of a vehicle production line in which groups of components are respectively connected to each other to form a fixed component composite—in the example embodiment, a body shell. The individual groups of components include a vehicle base, side parts 1 and metal sheet roofs 2 which are conveyed in groups on pallets in a conveying line 14 through the individual processing stations of the production line, where they are processed.

FIG. 7 shows a geometry station F1 and a joining station F2 which is arranged downstream of the station F1 in the conveying direction. The geometry station F1 has a tensing means comprising pillars 15 which are arranged on both sides of the conveying line 14 and can be detachably connected to each other in pairs, via a crossbeam in each case. The tensing means 15 has tensing elements for tensing the components 1 and 2. In the geometry station F1, the components of the respective group are tensed relative to each other in the joining position in which they are then connected permanently and fixedly to each other. With regard to the production line and to tensing the components, reference is made by way of example to EP 1 029 774 B1.

Once the permanently fixed connection has been produced, the tensing means 15 is detached, and the component composite which is then fixedly joined is conveyed onwards to the joining station F2. A certain cycle time, for example 60 seconds, is available for the tensing and permanently fixed connection in the geometry station F1. Within this time, the components 1 and 2—which beforehand are only loosely tacked—and the other components of the respective group of components have to be rigidly tensed relative to each other in the joining position. If transporting the components into and out of the station F1 and tensing them takes for example 35 seconds, then 25 seconds are still available for the joining process.

Robots 17 are arranged next to the conveying line 14 in the geometry station F1, and a tool head 10 is fastened to each of their robot arms. The geometry station F1 preferably has at least two robots 17, each fitted with a tool head 10, one to the left and one to the right of the conveying line 14. Additional robots 17 fitted with tool heads 10 can be arranged in the geometry station F1. In the remaining time still left after tensing the components in the geometry station F1—in the example scenario, 25 seconds—the components 1 and 2 are connected permanently and fixedly to each other by means of the tool heads 10, using laser-beam soldering. The robot 17 moves the tool head 10, program-controlled, along the joint formed by the components 1 and 2. While the joint is being traveled, soldering material is continuously melted off at the free end of the soldering wire 3 (FIG. 5) and deposited in the joint. The advancing speed V1 as measured along the joint is high enough that the fixing seam 11 can be produced over the entire length of the joint within the available time left. Once the fixing seam 11 has been produced, the tensing means 15 is detached, and the component composite which is then permanently and fixedly joined is conveyed onwards.

A component composite which has passed through the geometry station F1 in a preceding cycle is soldered to completion in the downstream joining station F2, the end-soldering station. In the joining station F2, at least one additional robot 17 is arranged on each of the two sides of the conveying line 14. The additional robots 17 are each fitted with a tool head 20 which differs from the tool head 10 of the geometry station F1 only with respect to the contact sensor. The tool head 20 is fitted with the modified contact sensor 9. In principle, the tool head 10 can also be fitted with the contact sensor 9, in order for all the tool heads required for laser-beam soldering to be designed identically.

The complete cycle time—60 seconds in the assumed example scenario—minus the transport time is available for the second process step of soldering to completion in the joining station F2, if no other processes are performed there which may conflict with the second process step. The tool heads 20 are coupled to the tool heads 10; at least the tool heads 10 and 20 arranged on the same side of the conveying line 14 are coupled to each other. The coupling is formed on each of the two sides of the conveying line 14 via a common energy-beam producer 21—in the example embodiment, a laser-beam producer. The two energy-beam producers 21 are connected to the at least one tool head 10 and the at least one tool head 20 of each side via energy transmission means 18 and 22—in the example embodiment, optical wave guides. The energy produced by the energy-beam producers 21 is transmitted to the energy emitters 7 of the tool heads 10 and 20 via the energy transmission means 18 and 22. In order to save energy at the energy-beam producers 21, they are alternately connected to either the at least one associated tool head 10 or the at least one associated tool head 20. The alternation between the tool heads 10 and 20 is configured such that in the cycle currently running, plus a buffer time as applicable, the at least one tool head 20 per side performs the second process step while the components 1 and 2 of a subsequent group of components are tensed in the geometry station F1. Once the second process step has been performed, they are switched and the at least one tool head 10 is supplied with energy, in order to fix the components 1 and 2 of a subsequent group of components to each other in a geometry-forming way.

The invention claimed is:

1. A method for soldering or welding metal body sheets in a series production of vehicle body parts comprising:
    a) producing a fixing seam which connects the components by melting a connecting material, which is supplied as an additional material or is formed by a base material of the components, along a joint formed by the components; and
    b) forming a finished connecting seam by melting a volume-forming layer of additional connecting material onto the fixing seam, or re-melting at least a portion of the fixing seam produced by means of the connecting material supplied as an additional material,
    c) wherein the fixing seam and the finished connecting seam are each progressively produced in the longitudinal direction of the joint at a respective production speed, wherein
    d) the production speed of the fixing seam is greater than the production speed of the finished connecting seam, and
    e) wherein the fixing seam is produced in a first joining station and the finished connecting seam is produced in a separate second joining station.

2. The method to claim 1, wherein wire-shaped connecting material is used, and a free end of the connecting material is moved and melted off along the joint.

3. The method according to claim 1, wherein the fixing seam is progressively produced along the joint at a speed of more than 3 m per minute, and the finished connecting seam is progressively produced along the joint at a speed of 3 m per minute at most.

4. The method according to claim 1, wherein when the volume-forming layer is being produced, additional connecting material of at least 1.5 times as much by mass is deposited per unit of length of the joint than when the fixing seam is being produced.

5. The method according to claim 1, wherein: the components are tensed relative to each other in a joining position by means of a tensing means and, while tensed, are connected in a geometry-forming way by means of the fixing seam; once the fixing seam has been produced, the tensing means is detached; and once the tensing means has been detached, the finished connecting seam is formed.

6. The method according to claim 1, wherein the production speed of the fixing seam is greater than the production speed of the finished connecting seam by a factor of at least 1.5.

7. The method according to claim 1, wherein the connecting material or additional connecting material is melted, melted-on or re-melted by means of an energy beam.

8. The method according to claim 7, wherein the energy beam is guided along the joint by means of a contact sensor, and the contact sensor runs off on mutually facing edges of the joint.

9. The method according to claim 7, wherein the energy beam is a laser beam.

10. A production line for joining components, the production line comprising:
    a) a conveying line for the components;
    b) a geometry station which is arranged in the conveying line and comprises a tensing means by means of which a group of the components can be tensed relative to each other in a joining position, and a first actuator which is freely movable spatially and comprises a first tool head;
    c) which, for energy-beam soldering or energy-beam welding the components situated in the joining position, comprises a first energy emitter for melting a supplied soldering or welding material or for melting only a base material of the components to be connected to each other;
d) and a second actuator which is arranged on the conveying line downstream of the geometry station in the conveying direction in a separate station, is freely movable spatially, and comprises a second tool head which, for energy-beam soldering or energy-beam welding, comprises a second energy emitter for melting the same or another soldering or welding material;
e) wherein at least one of the tool heads comprises a wire guide via which a wire of the soldering or welding material is conveyed in the longitudinal direction of the wire through an outlet of the tool head, and the energy emitter of the at least one of the tool heads is directed towards a tip of the wire.

11. The production line according to claim 10, wherein each of the two tool heads comprises a wire guide by means of which a soldering or welding wire can is respectively be conveyed in the longitudinal direction of the wire through an outlet of the respective tool head, and in that the energy emitters are directed towards a tip of the wire of the respective tool head.

12. The production line according to claim 10, wherein at least one of the energy emitters is a laser emitter.

13. The production line according to claim 10, comprising: an energy-beam producer; a first energy transmission means which connects the energy-beam producer to the first energy emitter; and a second energy transmission means which connects the energy-beam producer to the second energy emitter; wherein the energy-beam producer can be selectively connected to the first energy emitter or the second energy emitter via the respective energy transmission means.

14. The production line according to claim 10, comprising a controller by means of which the movements of the actuators can be controlled and the tool heads can be alternately activated.

15. The production line according to claim 14, wherein the controller activates the second tool head and moves it along the previously produced fixing seam by means of the second actuator and simultaneously keeps the first tool head deactivated.

* * * * *

UNITED STATES PATENT AND TRADEMARK OFFICE
CERTIFICATE OF CORRECTION

PATENT NO. : 8,686,314 B2  
APPLICATION NO. : 12/300037  
DATED : April 1, 2014  
INVENTOR(S) : Jochen Schneegans and Martin Kraft Page 1 of 1

It is certified that error appears in the above-identified patent and that said Letters Patent is hereby corrected as shown below:

On the Title Page, ITEM [56], References Cited, U.S. PATENT DOCUMENTS:
insert

-- 2007/0251927 A    11/2007    Miessbacher et al. --
-- 6,596,962 B2      07/2003    Haschke --
-- 6,250,533 B1      06/2001    Otterbein et al. --

Signed and Sealed this  
Tenth Day of June, 2014

Michelle K. Lee  
*Deputy Director of the United States Patent and Trademark Office*